United States Patent [19]
Phan

[11] Patent Number: 5,935,227
[45] Date of Patent: Aug. 10, 1999

[54] COMPUTER SYSTEM INCLUDING A RISER CARD WITH MULTIPLE INTER-COMPONENT CABLING ELIMINATION FEATURES

[75] Inventor: Truong Phan, Hillsboro, Oreg.

[73] Assignee: Intel Corporation, Santa Clara, Calif.

[21] Appl. No.: 08/935,475

[22] Filed: Sep. 24, 1997

[51] Int. Cl.[6] .............................. G06F 13/00; G06F 1/16
[52] U.S. Cl. ...................... 710/101; 710/100; 710/104; 361/683
[58] Field of Search ...................................... 395/281, 280, 395/284; 361/683, 684, 685, 686; 710/101, 100, 104

[56] References Cited

U.S. PATENT DOCUMENTS

| | | | |
|---|---|---|---|
| 5,594,621 | 1/1997 | Rumpt | 361/686 |
| 5,655,106 | 8/1997 | Smith | 395/500 |
| 5,831,821 | 11/1998 | Scholder et al. | 361/686 |
| 5,835,346 | 11/1998 | Albani et al. | 361/686 |

*Primary Examiner*—Ayaz R. Sheikh
*Assistant Examiner*—Ario Etienne
*Attorney, Agent, or Firm*—Blakely, Sokoloff, Taylor & Zafman

[57] ABSTRACT

A computer system is formed using a riser card having multiple inter-component cabling elimination features. These features include a number of connectors provided on the interior facing surface of the riser card for directly connecting a number of components to the riser card, including a motherboard and at least one other non-add-on card component. In one embodiment, the non-add-on card components include a power supply and a storage device, and the features further include a power on/off mechanism, an I/O port, a visual indicator and a display area directly disposed on the exterior facing surface of the riser card. These features are externalized by directly disposing the riser behind a front wall of a system chassis having corresponding openings.

21 Claims, 3 Drawing Sheets

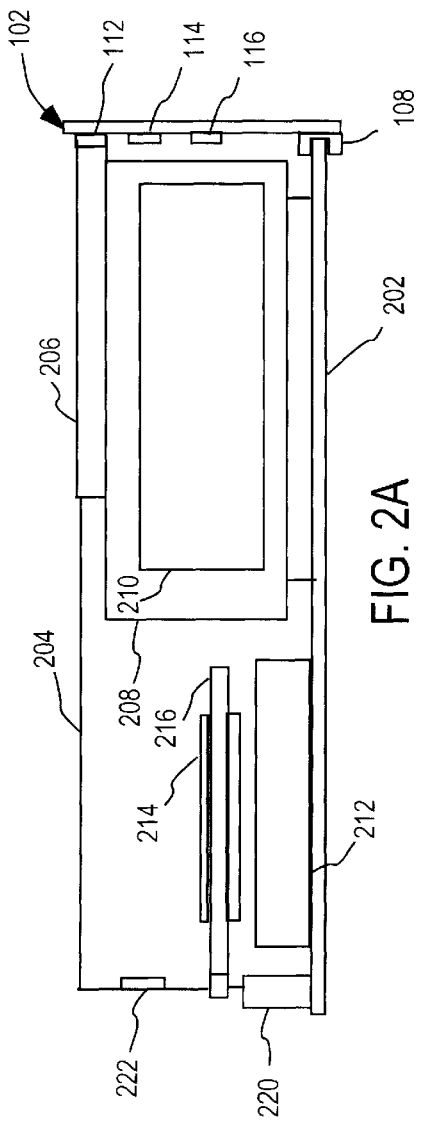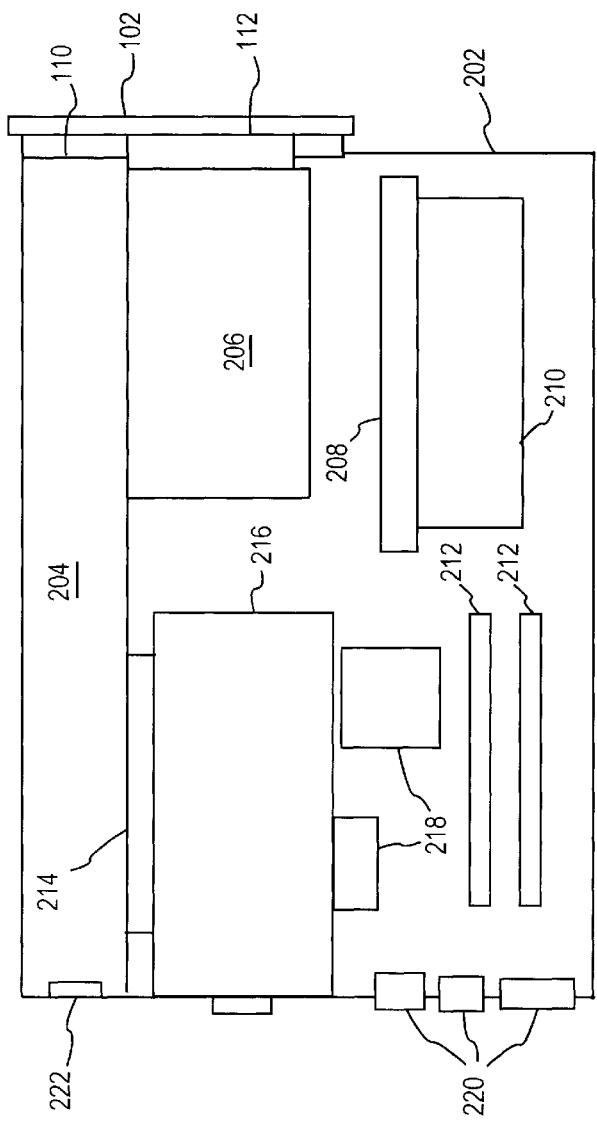

5,935,227

COMPUTER SYSTEM INCLUDING A RISER CARD WITH MULTIPLE INTER-COMPONENT CABLING ELIMINATION FEATURES

BACKGROUND OF THE INVENTION

1. Field of the Invention

The present invention relates to the field of computer systems. More specifically, the present invention relates to the art of inter-coupling components of computer systems.

2. Background Information

Microprocessor based computer systems are known in the art. Conventional microprocessor based computer systems suffer from a number of disadvantages. One of these disadvantages is the excessive reliance on cabling to inter-couple system components. For examples, cables are employed to couple system components to the power supply, and cables are employed to couple fixed drives and CDROM to the motherboard. As a result, conventional microprocessor based computer systems are difficult to manufacture and service. Thus, a more efficient approach to inter-coupling components of a microprocessor based computer system is desired.

SUMMARY OF THE INVENTION

A riser card having multiple inter-component cabling elimination features for used to form a computer system is disclosed. These features include a number of connectors provided on the interior facing surface of the riser card, to directly connect a number of components to the riser card, including a motherboard and at least one other non-add-on card component. In one embodiment, the components include a power supply and a storage device, and the riser card further includes a power on/off mechanism, an I/O port, a visual indicator and a display area provided on an exterior facing surface of the riser card.

A computer system formed using the above disclosed riser card is disclosed. In one embodiment, the riser card including features disposed on the exterior facing surface is employed. The riser card is disposed directly behind a front wall of a system chassis, which is provided with corresponding openings to externalize the power on/off mechanism etc.

A method for forming the above disclosed computer system is disclosed. The motherboard and the non-add-on card component(s) are first directly connected to the riser card. The connected elements are then enclosed, using a system chassis. In one embodiment, the enclosing is performed with the riser card directly disposed behind a front wall of the system chassis.

BRIEF DESCRIPTION OF DRAWINGS

The present invention will be described by way of exemplary embodiments, but not limitations, illustrated in the accompanying drawings in which like references denote similar elements, and in which:

FIGS. 2a–2b illustrate in further detail how various components are directly connected to the riser card of the present invention;

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1A:
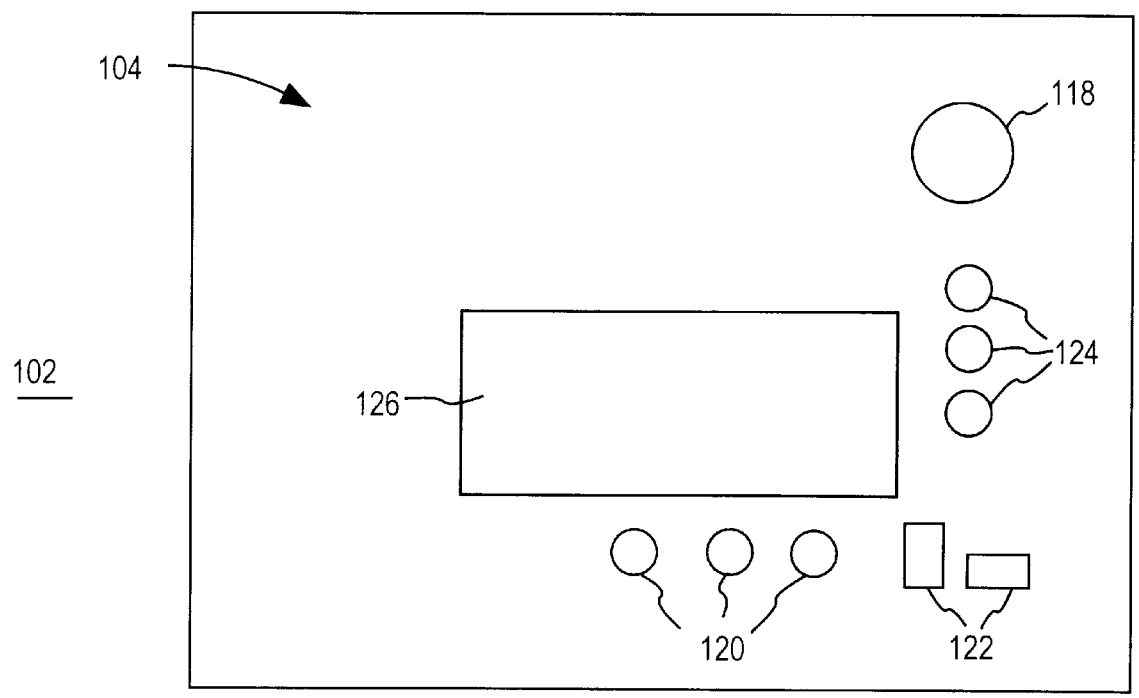
FIGS. 1a–1b illustrate one embodiment of the riser card of the present invention.
Figure 1B:
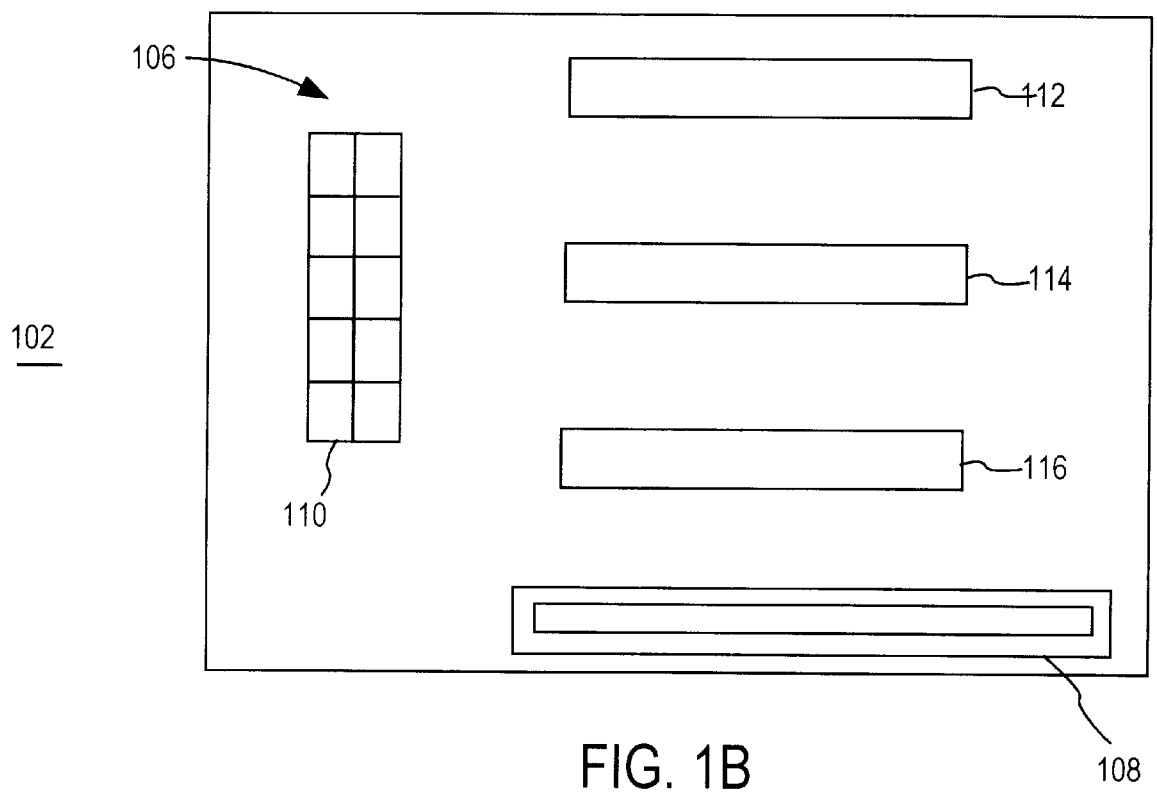

Referring now to FIGS. 1a and 1b, wherein a front and a rear view of one embodiment of the riser card of the present invention is illustrated. As shown, riser card 102 includes a number of inter-component cabling elimination features 108–126. For the illustrated embodiment, these features are disposed on front surface 104 as well as rear surface 106 of the card body. As will be apparent from the description to follow, relative to a system chassis (hereinafter simply chassis), front surface 104 is an exterior facing surface, whereas rear surface 106 is an interior facing surface.

For the illustrated embodiment, the features disposed on rear or interior facing surface 106 includes motherboard connector 108 for directly connecting a motherboard to riser card 102 by directly mating with a complementary connector of the motherboard, and a number of other connectors 110–116 for directly connecting a number of non-add-on card components to riser card 102 by mating with complementary connectors of the non-add on card components. For the illustrated embodiment, other connectors 110–116 include power supply connector 110 for directly connecting a power supply to riser card 102 by mating with a complementary connector of the power supply, and storage device connectors 112–116 for directly connecting a number of storage devices to riser card 102 by mating with complementary connectors of the storage devices. For the illustrated embodiment, storage device connectors 112–116 include fixed disk connectors 112–114 for directly connecting fixed disk drives to riser card 102 by mating with complementary connectors of the fixed drives, and diskette drive connector 116 for directly connecting a diskette drive to riser card 102 by mating with a complementary connector of the diskette drive. In each of the above described direct connections, the connectors are mated without the employment of intervening cabling.

For the illustrated embodiment, the features disposed on front or interior facing surface 104 include power on/off button 118 for facilitating powering on/off the host computer system, and I/O ports 120 and 122 for coupling external I/O devices to the host computer system. Examples of I/O ports 120 and 122 include but not limited to audio/video input/output ports for coupling audio/video devices to the host computer system, Universal serial bus (USB) ports for coupling USB compliant devices to the host computer system, and IEEE 1394 ports for coupling IEEE 1394 compliant device to the host computer system. Additionally, the features further include visual indicators 124 and display area 126 for providing visual indications and display messages respectively to a user of the host computer system. Examples of visual indicators include LCD lights for "power on", "HDD access" etc. Display messages may be any one of a number of system messages.

Note that all of the above front surface features are features directly disposed on the riser card. In other words, they are not connectors for the disclosed features. For the purpose of this application, the host computer system is the computer system "hosting" riser card 102, i.e. any computer system formed using riser card 102. USB compliant devices are those devices that comply with Universal Serial Bus Specification v1.0, published by Promoters of USB, c/o Intel Corporation, Santa Clara, Calif., and IEEE 1394 compliant devices are those devices that comply with High Performance Serial Bus (Standard P1394) of the Institute of Electrical and Electronic Engineers Inc. (IEEE), Draft 8.0v2, published Jul. 7, 1995.

FIGS. 2a and 2b illustrate in further details how the various components are directly connected to riser card 102 of the present invention, and reduces the amount of cabling required to constitute a computer system. FIG. 2a illustrates a side view of the interconnected components, whereas FIG. 2b illustrates a top view of the interconnected components. As shown and described earlier, motherboard 202 is directly connected to riser card 102 by mating motherboard connector 108 with a complementary connector of motherboard 202. For the illustrated embodiment, motherboard 202 includes a number of components attached to it. These components include processor package 208 having heat sink 210 attached to it, and right angle add-on card connector 214 having add-on card 216 attached to it. Other components include memory modules 212, I/O ports 220 and miscellaneous components 218.

An example of processor package 208 is disclosed in co-pending U.S. patent application Ser. No. 081739,815, filed on Oct. 30, 1996, entitled A Processor Card Assembly. Other processor package may also be used. Right angle add-on card connector 214 is the subject of co-pending U.S. patent application Ser. No. 08/936,857, filed contemporaneously, entitled A Computer System Including Right Angle Processor and Add-On Card Connectors, which is hereby fully incorporated by reference. An example of add-on card 216 is an add-on card having a Peripheral Component Interconnect (PCI) component. Example of I/O ports 220 are keyboard, mouse, serial and parallel ports. Examples of memory modules are Single In-Line Memory Modules (SIMM) and Dual In-Line Memory Modules (DIMM). Miscellaneous components 218 are intended to represent a broad category integrity circuits such as digital signal processors (DSP) commonly found on motherboards.

Continuing to refer to FIGS. 2a and 2b, in addition to having motherboard 202 directly connected to riser card 102, power supply 204 is also directly connected to riser card 102 by mating power supply connector 110 with a complementary connector of power supply 204. For the illustrated embodiment, power supply spans the entire length of the motherboard, with receptacle 222 disposed at the opposite end for receiving external A/C power. Additionally, fixed drive 206 is also directly connected to riser card 102 by mating fixed drive connector 112 with a complementary connector of fixed drive 206.

For the illustrated embodiment, fixed drive connector 114 is not used, however, a second fixed drive may also be directly connected to riser card 102. Similarly, diskette drive connector 116 is also "not used", however a diskette drive may be provided. Note that, when provided, the diskette drive is oriented towards the interior of the host computer system. Diskette drive connector 116 and the inward facing diskette drive (if provided) are the subject of co-pending U.S. patent application Ser. No. 08/936,856, filed contemporaneously, entitled A Computer System Including A Riser Card and A Chassis With Serviceability Features, which is hereby fully incorporated by reference.

Figure 3:
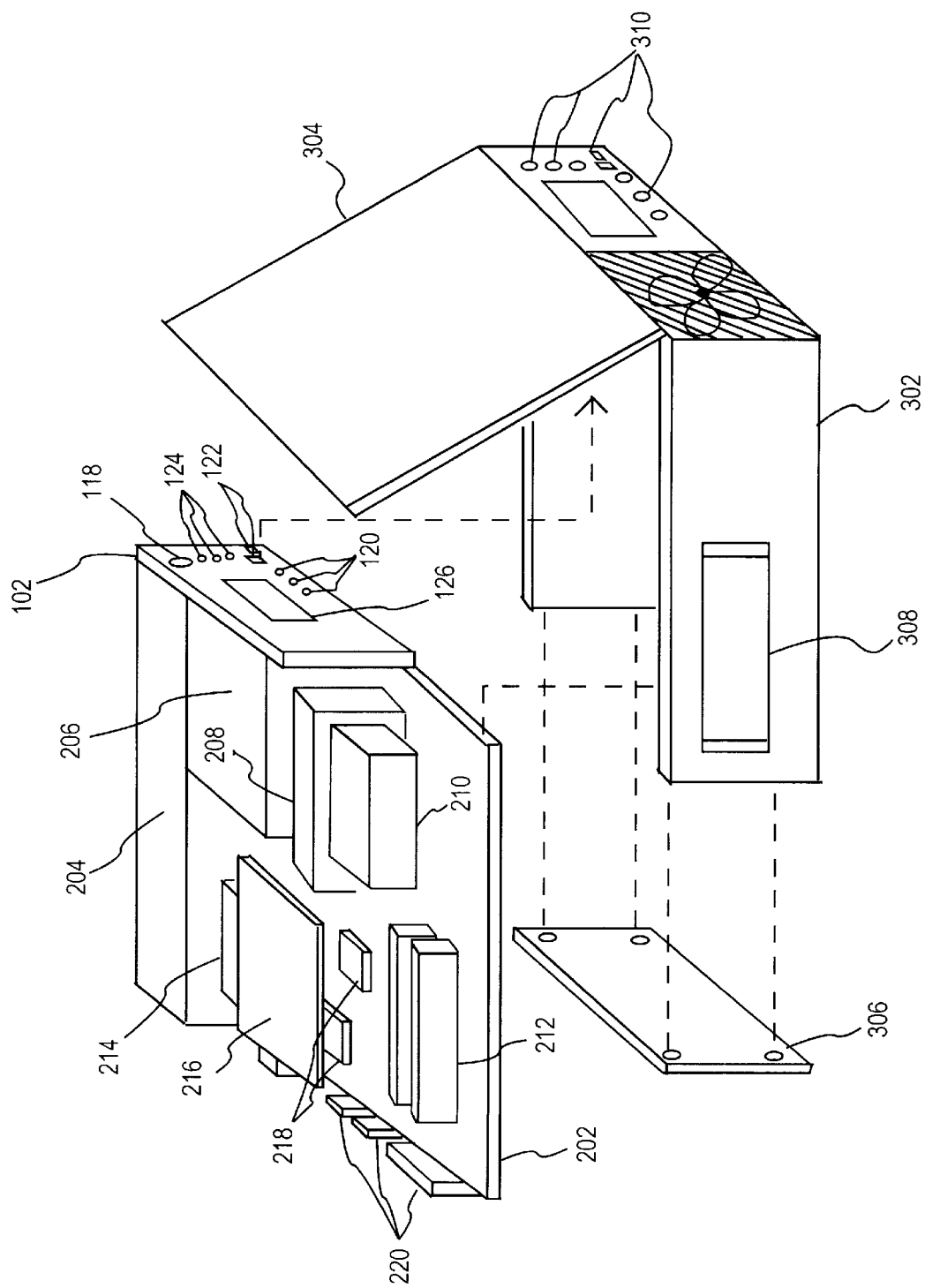
FIG. 3 illustrates in further detail how the interconnected components are placed into a chassis to form a computer system in accordance with one embodiment of the present invention.

FIG. 3 illustrates in further detail how the interconnected components are placed into a chassis to form a computer system in accordance with one embodiment of the present invention. As shown, the interconnected components, motherboard 202, riser card 102 etc. are placed into chassis 302 with riser card 102 disposed directly behind the front wall of chassis 302. For the illustrated embodiment, chassis 302 includes corresponding openings 310 disposed on its front wall to externalize the features disposed on riser card 102, i.e. power on/off button 108, I/O ports 122, indicator lights 124 and display area 126.

For the illustrated embodiment, chassis 302 further includes hinged top cover 304 and back panel 306, which when assembled, render the chassis effectively sealed, and the internal components inaccessible to an ordinary user. Other variations of top cover 304 and back panel 306 may be employed. Chassis 302 also includes covered opening 308 for serviceability, and back panel 306 includes corresponding openings for exposing I/O connectors 220 and receptacle 222 of full length power supply 204. An effectively sealed chassis is one that requires special tools and/or extraordinary effort to open. Sealed chassis 302 with covered opening 308 for serviceability is also the subject of incorporated by reference U.S. application Ser. No. 08/936, 856 identified above.

Thus, a computer system is formed with significant reduction in the amount of cabling employed. In fact, for all the components discussed, motherboard 202, power supply 204, etc., none require any cabling. Those skilled in the art will recognize that such a computer system represents a significant reduction in the complexity and cost of manufacturing. Those skilled in the art will also appreciate that the invention may be practiced with modifications and alterations within the spirit and scope of the appended claims. Accordingly, the above description is to be regarded as illustrative but not restrictive of the present invention.

Thus, a computer system including a riser card with multiple intercomponent cabling elimination features has been disclosed.

What is claimed is:

1. A riser card for use in forming a computer system with reduced amount of inter-component cabling, the riser card comprising:

a) a card body having a first surface designed to be interior facing, relative to a chassis of the computer system; and b) a plurality of connectors disposed on the interior facing first surface of the card body, designed to directly connect a plurality of components to the riser card, the components including a motherboard and at least one non-add-on card component.

2. The riser card as set forth in claim 1, wherein the plurality of connectors include a connector that directly connects a power supply to the riser card by mating with a complementary connector of the power supply.

3. The riser card as set forth in claim 1, wherein the plurality of connectors include a connector that directly connects a storage device to the riser card by mating with a complementary connector of the storage device.

4. The riser card of claim 1, wherein the card body further comprises a second surface designed to be exterior facing relative to the chassis, the riser card further comprises one or more of the followings, directly disposed on the exterior facing second surface of the card body:

c) a power on/off mechanism to facilitate powering the computer system on/off;

d) an I/O port designed to couple an external I/O device to the computer system;

e) an indicator light designed to provide visual indications to a user; and f) a display area designed to provide visual displays to the user; and the riser card is designed to be disposed directly behind a front wall of the chassis, the front wall having a plurality of openings externalizing the included ones of the power on/off mechanism, the I/O port, the indicator light and the display area.

5. A riser card for use in forming a computer system with reduced amount of inter-component cabling, the riser card comprising:

a) a card body having a first surface designed to be interior facing, relative to a chassis of the computer system;

b) a first connector disposed on the interior facing first surface of the card body, designed to directly connect a motherboard to the riser card by mating with a complementary connector of the motherboard; and c) a second connector disposed on the interior facing first surface of the card body, designed to directly connect a power supply to the riser card by mating with a complementary connector of the power supply.

6. A riser card for use in forming a computer system with reduced amount of inter-component cabling, the riser card comprising:

a) a card body having a first surface designed to be exterior facing, relative to a chassis of the computer system;

b) a first connector disposed on the interior facing first surface of the card body, designed to directly connect a motherboard to the riser card by mating with a complementary connector of the motherboard; and c) a second connector disposed on the first interior facing surface of the card body, designed to directly connect a storage device to the riser card by mating with a complementary connector of the storage device.

7. A riser card for use in forming a computer system with reduced amount of inter-component cabling, the riser card comprising:

a) a card body having a first and a second surface designed to be interior and exterior facing respectively, relative to a chassis of the computer system;

b) a first connector disposed on the interior facing first surface of the card body, designed to directly connect a motherboard to the riser card by mating with a complementary connector of the motherboard; and c) the riser card being designed to be disposed directly behind a front wall of the chassis, with one or more of the followings, directly disposed on the exterior facing second surface of the card body, (c.1) a power on/off mechanism designed to facilitate powering the computer system on/off, (c.2) an I/O port designed to couple an external I/O device to the computer system, (c.3) a visual indicator designed to provide visual indications to a user, and (c.4) a display area designed to provide visual displays to the user, the front wall of the chassis having a plurality of openings externalizing the includes ones of the power on/off mechanism, the I/O port, the visual indicator and the display area.

8. An apparatus with reduced amount of inter-component cabling, the apparatus comprising:

a) a riser card having a plurality of connectors disposed on an interior facing surface of the riser card;

b) a motherboard having a connector, directly connected to the riser card, with the connector of the motherboard mating with a complementary one of the plurality of connectors of the riser card; and c) a non-add-on card component having a connector, directly connected to the riser card, with the connector of the non-add-on card component mating with a complementary one of the plurality of connectors of the riser card.

9. The apparatus as set forth in claim 8, wherein the non-add-on card component is a power supply having a connector directly connecting the power supply to the riser card by mating with a complementary one of the connectors of the riser card, and a receptacle for receiving external AC power; and the apparatus further comprises d) a chassis enclosing the interconnected riser card, motherboard and power supply, the power supply spanning the chassis from a first end to a second end with the connector directly connecting the power supply to the riser card disposed at the first end, and the receptacle disposed at the second end.

10. The apparatus as set forth in claim 8, wherein the non-add-on card component is a storage device having a connector directly connecting the storage device to the riser card by mating with a complementary one of the connectors of the riser card; and the apparatus further comprises d) a chassis enclosing the interconnected riser card, motherboard and storage device.

11. The apparatus as set forth in claim 8, wherein the apparatus further comprises d) a chassis enclosing the interconnected riser card, motherboard and non-add-on card component;

the riser card is designed to be directly disposed behind a front wall of the chassis, and having an exterior facing surface with one or more of the followings directly disposed thereon:

(a.1) a power on/off mechanism designed to facilitate powering the computer system on/off, (a.2) an I/O port designed to couple an external I/O device to the computer system, (a.3) a visual indicator designed to provide visual indications to a user, (a.4) a display area designed to provide visual displays to the user, the front wall of the chassis having a plurality of openings externalizing the included ones of the power on/off mechanism, the I/O port, the visual indicator and the display area.

12. An apparatus with reduced amount of inter-component cabling comprising:

a) a riser card having a plurality of connectors disposed on an interior facing surface of the riser card;

b) a motherboard including a connector directly connecting the motherboard to the riser card by mating with a complementary one of the plurality of connectors of the riser card;

c) a power supply including a connector directly connecting the power supply to the riser card by mating with a complementary one of the plurality of connectors of the riser card, and a receptacle that receives external AC power; and d) a chassis enclosing the interconnected riser card, motherboard and power supply, the power supply spanning the chassis from a first end to a second end with the connector directly connecting the power supply to the riser card disposed at the first end, and the receptacle disposed at the second end.

13. An apparatus with reduced amount of inter-component cabling comprising:

a) a riser card having a plurality of connectors disposed on an interior facing surface of the riser card;

b) a motherboard including a connector directly connecting the motherboard to the riser card by mating with a complementary one of the plurality of connectors of the riser card;

c) a storage device including a connector directly connecting the storage device to the riser card by mating with a complementary one of the plurality of connectors of the riser card; and d) a chassis enclosing the interconnected riser card, motherboard and storage device.

14. An apparatus with reduced amount of inter-component cabling comprising:

a) a riser card having at least one connector disposed on an interior facing surface of the riser card, and one or more of the followings disposed on an exterior facing surface of the riser card:

(a.1) a power on/off mechanism designed to facilitate powering the apparatus on/off, (a.2) an I/O port designed to couple an external I/O device to the apparatus, (a.3) a visual indicator designed to provide visual indications to a user, (a.4) a display area designed to provide visual displays to the user;

b) a motherboard including a connector directly connecting the motherboard to the riser card by mating with a complementary one of the at least one connector of the riser card; and d) a chassis enclosing the interconnected riser card and motherboard with the riser card directly disposed behind a front wall of the chassis, the front wall of the chassis having a plurality of openings externalizing the included ones of the power on/off mechanism, the I/O port, the visual indicator and the display area.

15. A method for forming a computer system with reduced amount of inter-component cabling, the method comprising:

a) mating a connector of a motherboard with a complementary connector of a riser card to directly connect the motherboard to the riser card at an interior facing surface of the riser card; and b) mating a connector of a non-add-on card component with a complementary connector of the riser card to directly connect the non-add-on card component to the riser card at the interior facing surface of the riser card, and c) placing the interconnected riser card, motherboard and the non-add-on card component into a chassis enclosing the interconnected riser card, motherboard and the non-add-on card component.

16. The method as set forth in claim 15 wherein step (b) comprises mating a connector of a power supply with a complementary connector of the riser card to directly connect the power supply to the riser card at the interior facing surface of the riser card.

17. The method as set forth in claim 15 wherein step (b) comprises mating a connector of a storage device with a complementary connector of the riser card to directly connect the storage device to the riser card at the interior facing surface of the riser card.

18. The method as set forth in claim 15 wherein the riser card comprises one or more of the followings disposed on an exterior facing surface of the riser card:

(a.1) a power on/off mechanism designed to facilitate powering the computer system on/off, (a.2) an I/O port designed to couple an external I/O device to the computer system, (a.3) a visual indicator designed to provide visual indications to a user, (a.4) a display area designed to provide visual displays to the user;

step (c) comprises placing the inter-connected riser card, motherboard and non-add-on card component into the chassis with the riser card being directly disposed behind a front wall of the chassis, the front wall having a plurality of openings externalizing the includes ones of the power on/off mechanism, the I/O port, the visual indicator and the display area.

19. A method for forming a computer system with reduced amount of inter-component cabling, the method comprising:

a) mating a connector of a motherboard with a complementary connector of a riser card to directly connect the motherboard to the riser card at an interior facing surface of the riser card;

b) mating a connector of a power supply with a complementary connector of the riser card to directly connect the power supply to the riser card at the interior facing surface of the riser card; and c) placing the interconnected riser card, motherboard and the power supply into a chassis enclosing the interconnected riser card, motherboard and the power supply.

20. A method for forming a computer system with reduced amount of inter-component cabling, the method comprising:

a) mating a connector of a motherboard with a complementary connector of a riser card to directly connect the motherboard to the riser card at an interior facing surface of the riser card;

b) mating a connector of a storage device with a complementary connector of the riser card to directly connect the storage device to the riser card at the interior facing surface of the riser card; and c) placing the interconnected riser card, motherboard and the storage device into a chassis enclosing the interconnected riser card, motherboard and the storage device.

21. A method for forming a computer system with reduced amount of inter-component cabling, the method comprising:

a) mating a connector of a motherboard with a complementary connector of a riser card to directly connect the motherboard to the riser card at an interior facing surface of the riser card, the riser card further having one or more of the followings directly disposed on an exterior facing surface of the riser card:

(a.1) a power on/off mechanism designed to facilitate powering the computer system on/off, (a.2) an I/O port designed to couple an external I/O device to the computer system, (a.3) a visual indicator designed to provide visual indications to a user, (a.4) a display area designed to provide visual displays to the user; and b) placing the interconnected riser card and the motherboard into a chassis enclosing the interconnected riser card and motherboard, with the riser card disposed directly behind a front wall of the chassis, the front wall having a plurality of openings externalizing the included ones of the power on/off mechanism, the I/O port, the visual indicator light and the display area.

* * * * *

UNITED STATES PATENT AND TRADEMARK OFFICE
CERTIFICATE OF CORRECTION

PATENT NO. : 5,935,227
DATED : August 10, 1999
INVENTOR(S) : Phan et al.

It is certified that error appears in the above-identified patent and that said Letters Patent is hereby corrected as shown below:

Column 3,
Line 29, delete "081739,815" and insert -- 08/739,815 --.

Signed and Sealed this

Eighteenth Day of March, 2003

JAMES E. ROGAN
*Director of the United States Patent and Trademark Office*